(No Model.)
L. P. CONARD.
BUTTON OR STUD.
No. 324,302. Patented Aug. 11, 1885.
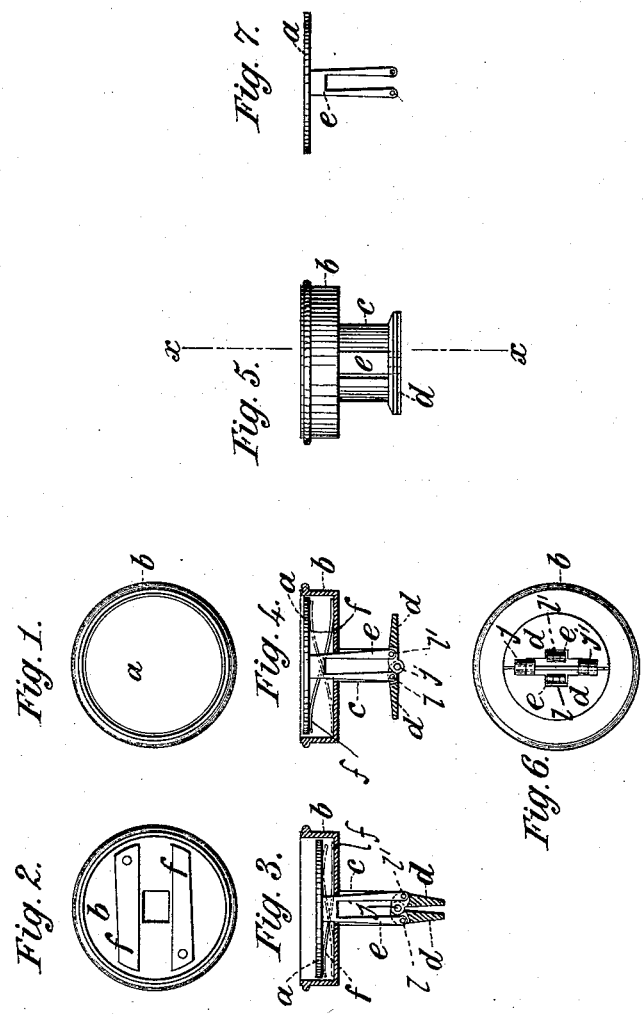
Witnesses
William Miller
J. A. Rutherford
Inventor
Leon Paul Conard
by Van Santvoord & Hauff
his attys

United States Patent Office.

LÉON PAUL CONARD, OF LONDON, ENGLAND, ASSIGNOR OF ONE-HALF TO CHARLES FERDINAND VEIT AND GEORGE DICKMAN, BOTH OF SAME PLACE.

BUTTON OR STUD.

SPECIFICATION forming part of Letters Patent No. 324,302, dated August 11, 1885.

Application filed December 31, 1884. (No model.)

*To all whom it may concern:*

Be it known that I, LÉON PAUL CONARD, of 48 Langham Street, London, England, have invented certain new and useful improvements in fasteners applicable as studs or solitaires, or as fastenings for ladies' reticules and other articles, of which the following is a specification.

My invention relates to improvements in buttons; and it consists in the combination, with a hollow button-head and a hollow or slotted shank, of a spring-supported disk which fits the hollow head and can move therein in the direction of the shank, two leaves hinged to the shank, and a forked rod to which the leaves are pivoted, and which connects the leaves with the spring-supported disk.

In the accompanying drawings, Figure 1 is a top view of my improved button. Fig. 2 is a similar view with the spring-supported disk removed. Fig. 3 is a vertical section in the plane $x$ $x$, Fig. 5, showing the spring-supported disk depressed. Fig. 4 is a vertical section in the same plane, showing the button in its normal condition. Fig. 5 is a side view of the button. Fig. 6 is a bottom view of the same. Fig. 7 is a view of the spring-supported disk and the forked rod secured thereto.

Similar letters indicate corresponding parts.

In these drawings, the letter $c$ designates the hollow or slotted shank of the button, having the hollow button-head $b$ rigidly secured to one of its ends. $a$ is a disk adapted to move up and down inside the head $b$, and it is subjected to the action of the springs $f$, secured to the bottom of the button-head $b$. To the other end of the shank $c$ are hinged at $j$ $j'$ the leaves $d$ $d$, Fig. 6, which leaves are also hinged or pivoted at $l$ $l'$ to the prongs of the forked rod $e$, which is secured to the spring-supported disk $a$ either rigidly or loosely. The action of the springs $f$ $f$ against the disk $a$ tends to keep the same in its raised position, Fig. 4, in which condition it is flush, or nearly so, with the edges of the head $b$, and consequently when the disk occupies this position the leaves $d$ $d$ are extended or brought into a plane parallel to the plane of the disk.

When the button is to be used as a cuff-button, the shank $c$ is made of an oval cross-section, in order that it can be more easily inserted in the buttonholes.

When it is desired to insert the button into the button-holes of a cuff, the disk $a$ is depressed, whereby the leaves $d$ $d$ are caused to fold, Fig. 3, and the leaves and shank can be easily pushed through the button-holes, and on releasing the disk $a$ the springs $f$ raise the same into its normal position, and the leaves $d$ $d$ are extended, whereby the cuff-button is securely held.

I do not restrict my button to its application as a cuff-button or stud, as it may also be used as a catch for reticules, purses, and the like. When used for the latter purpose, the button is secured to one frame of the article, and in the other frame a slot or opening is made, into which the folded leaves are inserted and then allowed to extend, as before described.

In order to improve the appearance of my cuff-button, a stone—for instance, onyx—may be secured to the disk, or the disk itself may be made of such stone, or it may be covered with enamel.

What I claim as new, and desire to secure by Letters Patent, is—

The combination, substantially as hereinbefore described, with the hollow button-head $b$ and the hollow or slotted shank $c$, of the spring-supported disk $a$, which fits the hollow head and can move therein in the direction of the shank, the leaves $d$ $d$, hinged to the shank, and the forked rod $e$, to which the leaves are pivoted, and which connects said leaves with the spring-supported disk.

LÉON PAUL CONARD.

Witnesses:
   HERMANN RECK,
     65 *Ockendon Road, Islington, N.*
   LOUIS WHITE,
     10 *Tierney Road, Streatham, S. W.*